(12) United States Patent
Stentz

(10) Patent No.: US 6,989,923 B2
(45) Date of Patent: Jan. 24, 2006

(54) OPTICAL AMPLIFIER HAVING AUTOMATIC GAIN CONTROL WITH IMPROVED PERFORMANCE

(75) Inventor: Andrew John Stentz, Clinton, NJ (US)

(73) Assignee: Photuris, Inc., Piscataway, NJ (US)

( * ) Notice: Subject to any disclaimer, the term of this patent is extended or adjusted under 35 U.S.C. 154(b) by 0 days.

(21) Appl. No.: 09/925,838

(22) Filed: Aug. 8, 2001

(65) Prior Publication Data
US 2003/0030894 A1 Feb. 13, 2003

(51) Int. Cl.
*H01S 3/00* (2006.01)

(52) U.S. Cl. ............................................... 359/341.41

(58) Field of Classification Search ............ 359/341.41, 359/341.4, 341.42
See application file for complete search history.

(56) References Cited

U.S. PATENT DOCUMENTS

| | | | |
|---|---|---|---|
| 5,117,196 A | 5/1992 | Epworth et al. ............. 359/333 |
| 5,245,690 A | 9/1993 | Aida et al. ................... 385/142 |
| 5,710,660 A | 1/1998 | Yamamoto et al. ......... 359/341 |
| 5,923,462 A * | 7/1999 | van der Plaats .......... 359/341.3 |
| 6,025,947 A | 2/2000 | Sugaya et al. .............. 359/160 |
| 6,038,063 A | 3/2000 | Tsuda et al. ................. 359/341 |
| 6,348,987 B1 * | 2/2002 | Tomofuji ..................... 359/177 |
| 6,356,386 B1 * | 3/2002 | Denkin et al. ............... 359/337 |
| 6,366,394 B1 * | 4/2002 | Begin et al. .............. 359/341.3 |
| 6,366,395 B1 * | 4/2002 | Drake et al. ............ 359/341.41 |
| 6,377,394 B1 * | 4/2002 | Drake et al. ............ 359/341.41 |
| 6,396,625 B1 * | 5/2002 | Nakaji .................... 359/341.41 |
| 6,407,854 B1 * | 6/2002 | Shum ..................... 359/341.41 |
| 2001/0012148 A1 * | 8/2001 | Choi et al. ................ 359/341.4 |
| 2001/0033413 A1 * | 10/2001 | Lelic et al. ............... 359/341.4 |
| 2001/0040720 A1 * | 11/2001 | Gerrish et al. ........... 359/341.4 |
| 2001/0040721 A1 * | 11/2001 | Gerrish et al. ......... 359/341.41 |
| 2001/0043389 A1 * | 11/2001 | Bonnedal et al. ...... 359/341.41 |
| 2002/0075562 A1 * | 6/2002 | Youn et al. ............. 359/341.41 |

OTHER PUBLICATIONS

Mitsunori Fukutoku et al., "Pump power reduction of optical feedback controlled EDFA using electrical feedforward control," Technical Digest, Optical Amplifiers and Their Applications, Jul. 27–29, 1998, Vail, Colorado, pp. 15–18.

Emmanuel Desurvire, *Erbium–Doped Fiber Amplifiers*, John Wiley & Sons, 1994, pp. 410–413, 468–491.

U.S. Appl. No. 09/571,833, filed May 16, 2000, Wagener et al.

U.S. Appl. No. 09/691,812, filed Oct. 19, 2000, Wagener et al.

* cited by examiner

*Primary Examiner*—Mark Hellner
*Assistant Examiner*—Deandra M. Hughes
(74) *Attorney, Agent, or Firm*—Mayer Fortkort & Williams PC; Stuart M. Mayer, Esq.

(57) ABSTRACT

A method and apparatus is provided for automatically controlling the gain of an optical amplifier. The method begins by generating a first control signal based on a feed-forward error signal and a second control signal based on the feedback error signal. Next, the pump source is adjusted in accordance with the control signals. In this way both the speed of a feed-forward arrangement and the accuracy of a feedback arrangement can be achieved.

47 Claims, 5 Drawing Sheets

SCHEMATIC ILLUSTRATION OF THE
RELEVANT ENERGY LEVELS OF ERBIUM IONS

GAIN OF AN EDFA AS A
FUNCTION OF INPUT SIGNAL POWER

SCHEMATIC ILLUSTRATION OF THE EVOLUTION
OF THE OUTPUT POWER OF ONE CHANNEL
FROM A TYPICAL EDFA OPERATING UDER AGC

OPTICAL AMPLIFIER HAVING AUTOMATIC GAIN CONTROL WITH IMPROVED PERFORMANCE

FIELD OF THE INVENTION

The present invention relates generally to optical amplifiers, and more particularly to optical amplifiers that employ automatic gain control.

BACKGROUND OF THE INVENTION

In a WDM transmission system, two or more optical data carrying channels, each defined by a different carrier wavelength, are combined onto a common path for transmission to a remote receiver. The carrier wavelengths are sufficiently separated so that they do not overlap in the frequency domain. The multiplexed channels are demultiplexed at the receiver in the optical and possibly also in the electrical domain. Demultiplexing in the optical domain requires using frequency-selective components such as optical gratings or bandpass filters. Typically, in a long-haul optical fiber system, an optical amplifier would amplify the set of wavelength channels simultaneously, usually after traversing distances less than about 120 km.

One class of optical amplifiers is rare-earth doped optical amplifiers, which use rare-earth ions as the active element. The ions are doped in the fiber core and pumped optically to provide gain. The silica fiber core serves as the host medium for the ions. While many different rare-earth ions such as neodymium, praseodymium, ytterbium etc. can be used to provide gain in different portions of the spectrum, erbium-doped fiber amplifiers (EDFAs) have proven to be particularly attractive because they are operable in the spectral region where optical loss in the fiber is minimal. Also, the erbium-doped fiber amplifier is particularly useful because of its ability to amplify multiple wavelength channels without crosstalk penalty, even when operating deep in gain compression. EDFAs are also attractive because they are fiber devices and thus can be easily connected to telecommunications fiber with low loss.

FIG. 1 shows an energy level diagram for the $Er^{+3}$ system. As shown, light of wavelength 980 nm is absorbed by the erbium ions, exciting the ions to the higher energy state $^4I_{11/2}$. This excited state rapidly decays (with a time constant $\tau_{32}$ of about 10 microseconds) to the metastable state $^4I_{13/2}$ without radiative emission. The metastable state alternatively may be reached by the absorption of light at 1480 nm, which corresponds to the upper edge of the band defining the metastable state. The metastable state deexcites by emitting photons at different wavelengths, with peak photon emission occurring at about 1530 nm. This deexcitation may occur spontaneously or by stimulated emission with an optical signal having a wavelength around 1530 nm. Since the metastable state is relatively long-lived (with a time constant $\tau_{21}$ of about 10 milliseconds), stimulated emission is much more likely to occur than spontaneous emission under typical operating conditions. Stimulated emission causes amplification of the optical signal, which induced the stimulated emission.

The signal power directed to the input of an optical amplifier employed in an optical communication system can vary for a large number of reasons. For example, power variations can be caused by an intentional increase or decrease in the number of channels for the purpose of routing traffic, by the unintentional loss of channels due to a fiber cut or human error, changes in span losses, and component loss changes due to aging or temperature fluctuations. FIG. 2 shows how the amplifier gain typically varies with the total input signal power. The gain at small input signal power levels is known as the small-signal gain. As the input power is increased, the gain of the amplifier begins to decrease. When the amplifier is generating less than its small-signal gain, it is said to be operating in saturation. Saturation of the amplifier typically occurs when the signal power within the amplifier becomes a significant fraction of the pump power, leading to pump depletion and a reduction in the amplifier gain. In a heavily saturated amplifier, the total output signal power will remain roughly constant even while the total input signal power changes. For instance, if N channels located at different wavelengths each having an equal power are initially injected into a heavily saturated, gain-flattened amplifier, and then the number of channels is suddenly reduced to one, the total output power from the amplifier will remain constant. Therefore, the output power of the remaining channel will have increased from its initial value by approximately by a factor of N.

Since amplifier gain is designed to offset loss in a transmission system, it is important to maintain a constant amplifier gain as the input power changes. This type of control is commonly referred to as automatic gain control (AGC) or transient control. It is well known that AGC can be achieved by adjusting the pump power supplied to the amplifier. In general, the required change in pump power depends not only on the input signal power level but also on the spectral content of the input signal.

Well known techniques for implementing AGC by controlling pump power include feed-forward and feedback arrangements. In a feed-forward arrangement the pump power is adjusted based solely upon changes to the input signal. Typically, the feed-forward pump power adjustment is made based on a change in the aggregate input-signal power. While feed-forward arrangements offer the advantage of a fast response time, they can also be inaccurate, since the appropriate pump power is a function of not only the input power but also the spectral content of the input signal. Moreover, the accuracy of a feed-forward arrangement generally diminishes over time because as the various components of the amplifier age their characteristics often change.

In a feedback arrangement, the parameters used to determine the appropriate pump power include at least one output parameter, and no changes are made to the pump power based solely upon changes to the power of the input signal. For instance, the input and output optical signals may be detected and used to determine the actual gain of the amplifier. This measured gain may then be used to adjust the pump power until the desired gain is achieved. For example, FIG. 3 shows an optical amplifier with such a feedback control. The arrangement of FIG. 3 comprises an erbium doped fiber 1, a pump laser 2, a wavelength multiplexer 3 which multiplexes the pump laser output and an input optical signal which is to be amplified and is input at port 4, an input signal tap 12, which serves to split off a small portion of the input signal to doped fiber 1, an output signal tap 5, which serves to split off a small portion of the output signal, an output port 6 for receiving the amplified optical signal, detectors 8 and 14, electronic amplifiers 9 and 16 and a feedback circuit 10.

In operation, the optical signal to be amplified is input via port 4 of multiplexer 3, multiplexed with the optical pump signal output from laser 2 and amplified in the erbium doped fiber 1. Tap 12, which may be a fused fiber coupler, for example, splits off a small proportion of the signal input to the fiber 1. This small part of the amplified signal, which is employed as a control signal, is detected by detector 14, amplified by electronic amplifier 16 and applied to the feedback circuit 10. Likewise, tap 5, which may also be a fused fiber coupler, for example, splits off a small proportion of the amplified signal output from fiber 1. This small part of the amplified signal, which also serves as a control signal, is detected by detector 8, amplified by amplifier 9 and applied to the feedback circuit 10. Feedback circuit 10 determines the amplifier gain based on the two control signals it receives. The output from the feedback circuit 10 is applied to the pump laser 2 and serves to vary the pump laser 2 output power to maintain constant gain.

One variant of the feedback arrangement shown in FIG. 3 employs the amplified spontaneous emission (ASE) rather than the signal itself as the control signal. As is well known, all optical amplifiers generate ASE. As shown in FIG. 4, conventional "C-band" erbium amplifiers provide substantial gain in the range of 1529–1564 nm. Likewise, the ASE is strongest over this same wavelength range because the ASE power is directly proportional to amplifier gain. That is, the intensity of the amplified spontaneous emission from the amplifier is dependent on amplifier gain, and thus a measure of ASE provides an indirect measure of the amplifier gain. Accordingly, one or more wavelengths within the 1529–1564 range may be reserved for measuring ASE at that wavelength. For example, in FIG. 4, ASE is measured at a wavelength of 1.551 microns, which can therefore be used to form the basis of a gain control loop of the form illustrated in FIG. 5.

In FIGS. 3 and 5, like elements are denoted by like reference numerals. In FIG. 5, however, coupler 5 is now a wavelength selective coupler that splits off a small portion of the ASE. Thus in this arrangement amplifier gain is monitored by monitoring the ASE over the wavelengths demultiplexed by coupler 5, which is used by the feedback loop to keep the amplifier gain constant by varying the pump power accordingly.

The previously discussed feedback arrangements for providing an optical amplifier with AGC have a number of advantages and disadvantages. For instance, one advantage of the first approach in which the signal itself is used as the control signal is that it can use broadband input and output couplers, which are simple and inexpensive components. However, a feedback system that uses a portion of the amplified signal as the control signal is only accurate if the gain of the optical amplifier is wavelength-independent. On the other hand, while a feedback approach that uses the ASE as the control signal can be used with an optical amplifier having a wavelength-dependent gain, it requires a relatively expensive filter to de-multiplex the ASE from the output signals and the ASE level may not be directly proportional to gain in some amplifier designs.

Moreover, all feedback approaches have one disadvantage in common: they cannot respond to a transient change in the input power until a disruption in the performance of the amplifier is measured. In other words, the response time of the AGC is limited by the latency of the EDFA itself. This disadvantage is particularly troublesome when a very large change in the input power occurs on a timescale that is much faster than the response time of the amplifier, i.e. ~1 µs for a typical saturated telecommunications amplifier Accordingly, there is a need for an optical amplifier having an improved automatic gain control arrangement that is both accurate and fast to respond.

SUMMARY OF THE INVENTION

In accordance with the present invention, a method is provided for automatically controlling the gain of an optical amplifier. The method begins by generating a control signal based on a feed-forward error signal and a feedback error signal. Next, the pump source is adjusted in accordance with the control signal.

In accordance with one aspect of the invention, the feed-forward error signal is proportional to a change in power of an optical signal received at an input to the optical amplifier.

In accordance with another aspect of the invention, the feedback error signal is proportional to a difference between a desired gain and a measured gain. The measured gain is determined from the power of an optical signal received at an input of the optical amplifier and the power of an optical signal received at an output of the optical amplifier.

In accordance to yet another aspect of the invention, the feedback error signal is proportional to the difference between a desired ASE power and the power of ASE received at an output of the optical amplifier.

In accordance with another aspect of the invention, the adjusting step is performed in accordance with a PID scheme.

In accordance with another aspect of the invention, the control signal is initially based only on the feed-forward error signal when the change in the power of the optical signal received at the input to the optical amplifier exceeds a predetermined threshold.

In accordance with another aspect of the invention, an optical amplifier with automatic gain control is provided. The optical amplifier includes a rare-earth doped fiber for imparting gain to an optical signal propagating therethrough and a pump source for supplying pump power to the rare-earth doped fiber. A first coupler is located at the output of the doped fiber for receiving a portion of output power generated by the rare-earth doped fiber. A first photodetector is provided for converting the portion of the output power to a first control signal. A second coupler is located at the input of the doped fiber for receiving a portion of the optical signal. A second photodetector is also provided for converting the portion of the optical signal to a second control signal. A controller, which receives the first and second control signals, generates a bias current for driving the pump source. The bias current has a value based on at least first and second components. The first component is determined by the second control signal and the second component is determined by both the first and second control signals.

In accordance with another aspect of the invention, a method is provided for automatically controlling the gain of an optical amplifier. The method begins by generating a first control signal based on a feed-forward error signal and a second control signal based on the feedback error signal. Next, the pump source is adjusted in accordance with the control signals.

DETAILED DESCRIPTION

The present invention employs both feedback and feed-forward arrangements to provide an optical amplifier with automatic gain control. Such a configuration has been found to be advantageous because it overcomes the previously mentioned problems when only a feedback arrangement is employed while ameliorating the disadvantages that arise with the exclusive use of a feed-forward arrangement.

It is well known that the response time over which an EDFA responds to a change in input power is determined predominantly by the lifetimes $\tau_{32}$ and $\tau_{21}$, the signal and pump powers, and the signal and pump saturation powers. In the absence of AGC and under typical operating conditions, a typical EDFA takes a time ranging from tens to hundreds of microseconds to respond to an instantaneous change in input power and to reach 90% of its steady-state output power. When large input-power changes occur in times less than this latency period, an amplifier employing AGC based solely on feedback may allow undesirably large fluctuations in the signal gain. The manner in which such fluctuations are characterized will be illustrated in connection with FIG. 6.

Figure 6:
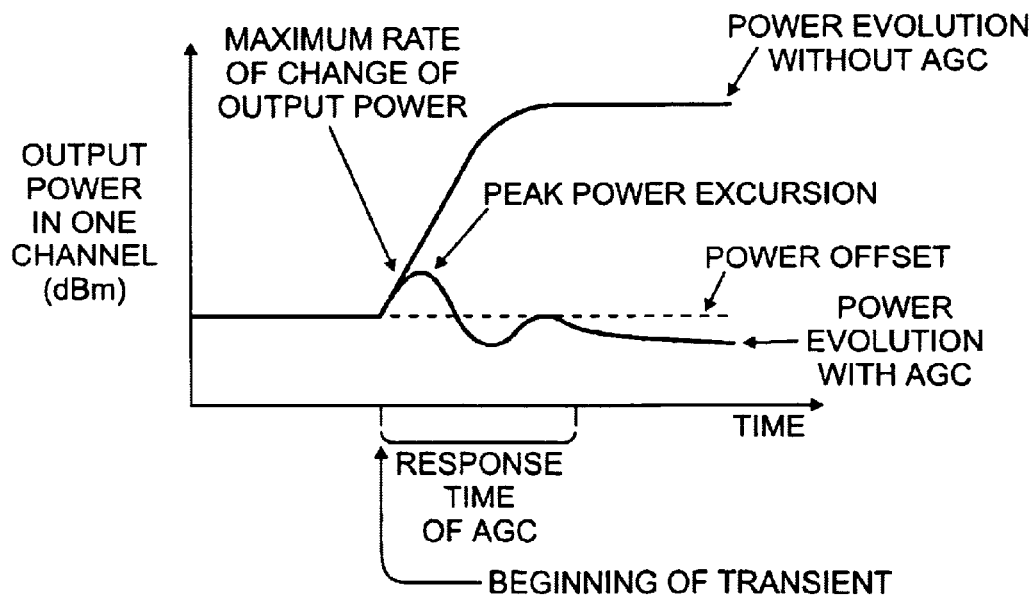
FIG. 6 shows the power fluctuations of a single channel in a WDM signal over a period of time during which a transient event occurs.

FIG. 6 shows the power fluctuations of a single channel or wavelength in a WDM signal over a period of time during which a transient occurs in which all but one of the channels are quickly dropped from the amplifier input. In particular, the output power of the remaining channel spikes upward in a typical EDFA operating under AGC shortly after the other wavelengths of the WDM signal are quickly dropped from the amplifier input. Such a situation could arise if there were a fiber-cut in a cable, for example. The amplifier's response to the transient event can be characterized by the maximum rate of change of the output power, the peak power or gain excursion (i.e., the maximum difference between the actual gain and the target gain over the period of the transient), the recovery time (i.e., the time it takes for the power to recover to within 10% of its steady-state output power), and the power or gain offset (i.e., the difference in the pre-transient gain experienced by a wavelength and the steady-state post-transient gain). It is well known that when transient behavior is studied in a chain of amplifiers such as used in a long-haul optical transmission system, the maximum rate of change, the peak gain excursion and the recovery times experienced by the signal all increase, further exacerbating the problems caused by the latency of the optical amplifiers.

Feed-forward schemes avoid this disadvantage of feedback schemes by allowing adjustments to the pump power to be made as soon as possible once a transient in the input power is measured. In this case, there is no latency in the AGC arising from the finite response time of the EDFA. On the other hand, a major disadvantage of a feed-forward arrangement is that while the pump power required to maintain a given gain shape depends coarsely on the input power, on a finer level, the required pump power also depends on the spectral composition of the input signal. Furthermore, a feed-forward approach may become inaccurate over time due to the aging of components. For instance, the required current that needs to be supplied to the pump laser so that the pump can inject a given amount of optical pump power into the amplifier fiber may change over time due to a reduction in the coupling efficiency between the pump laser and its output fiber. Therefore, while feed-forward approaches have the advantage of speed, they may lack the required accuracy.

As described below, the present invention advantageously provides both the speed of a feed-forward arrangement and the accuracy of a feedback arrangement.

Figure 7:
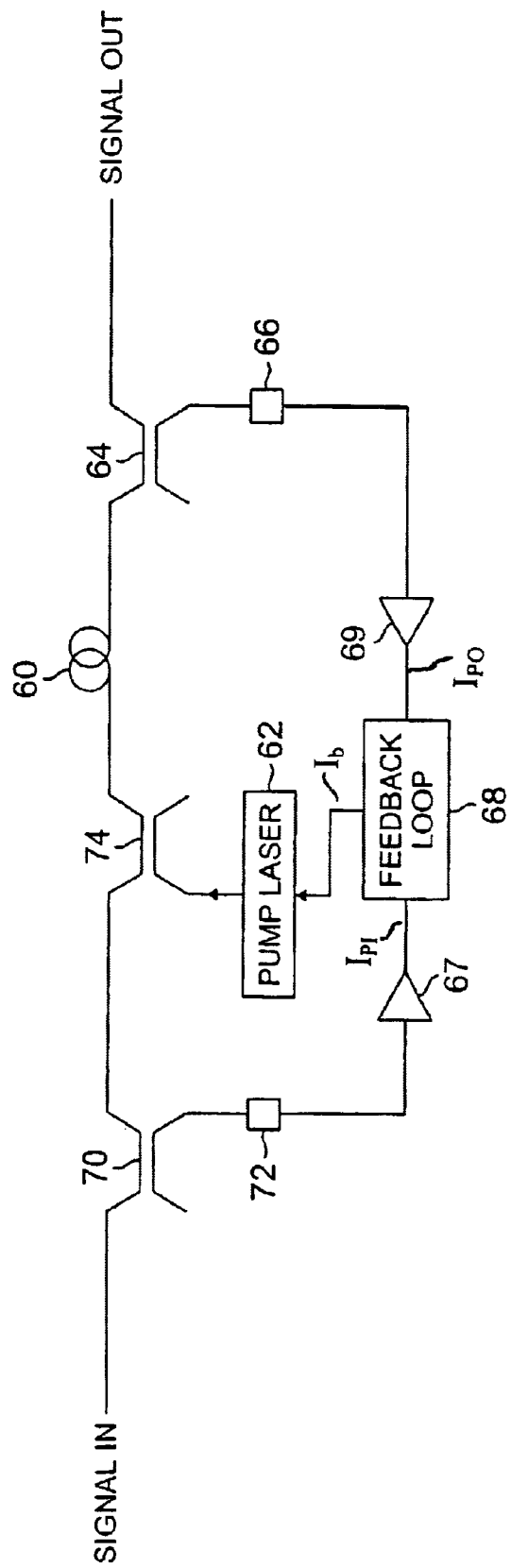
FIG. 7 shows one embodiment of an optical amplifier that incorporates an AGC arrangement in accordance with the present invention.

FIG. 7 shows one embodiment of an optical amplifier that incorporates an AGC arrangement in accordance with the present invention. As shown, the optical amplifier includes a rare-earth doped fiber such as an erbium doped fiber 60 and a pump laser 62 for supplying pump power to the doper fiber 60 via coupler 74. The feedback path includes a first coupler 64 located at the output of the erbium doped fiber 60, which taps a small portion of the optical output signal and directs it to a detector such as photodiode 66 to generate a photocurrent that is amplified by electronic amplifier 69 and which serves as a first electrical control signal. The first electrical control signal is applied to the feedback circuit 68. The feedback path also includes a second coupler 70 located at the input of the erbium doped fiber 60, which taps a small portion of the optical input signal and directs it to a detector such as photodiode 72 to generate a photocurrent that is amplified by electronic amplifier 67 and serves as a second electrical control signal, which is also applied to feedback circuit 68.

As shown, the first and second control signals are represented by $I_{PO}$ and $I_{PI}$, respectively. The bias current supplied to the pump laser 62 by the feedback circuit 68 is represented by $I_b$. The portion of the photocurrent $I_{PO}$ arising from ASE may be represented by $I_{ASE}$ (if the ASE is being employed as the control signal then $I_{po}=I_{ASE}$). In order to accurately measure the signal power from the amplifier output, the first control signal $I_{PO}$ may need to be offset by $I_{ASE}$.

Figure 5:
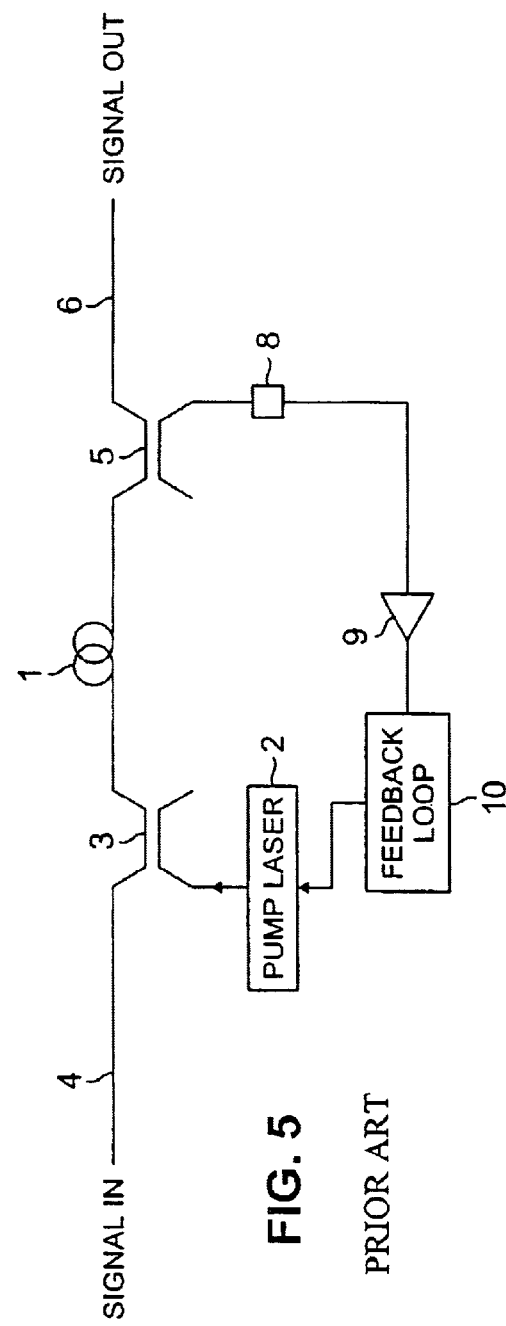
FIG. 5 shows another conventional optical amplifier with feedback control that employs ASE as the basis for controlling gain.
Figure 4:
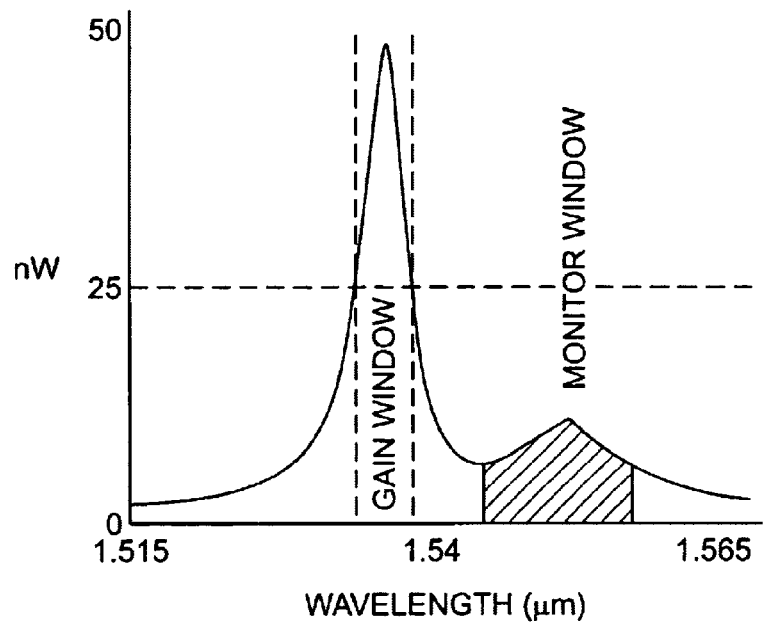
FIG. 4 shows the ASE spectrum for an erbium fiber amplifier.

An error signal can be calculated for properly adjusting the pump bias current $I_b$ such that fluctuations of the gain of the optical amplifier are minimized. For example, in a conventional feedback scheme using broadband input and output taps to measure the input and output powers, the error signal E is given by $$E = (I_{po} - I_{ASE}) - G_s I_{pi}$$

where $G_s$ is determined by the desired or target amplifier gain and the $I_{ASE}$ may be estimated from the operating conditions of the amplifier. Of course, alternate feedback schemes can be employed which would utilize different error signals. For instance, if the feedback arrangement is similar to that shown in FIG. 5 in which the ASE is used as the basis for gain control, the error signal may simply employ the difference between the target and measured values of the ASE power.

Adjustments to the bias current may be calculated from a variety of approaches. One common approach, known as proportional-integral-differential (PID) feedback calculates the bias current with the following equation:

$$I_b = g_{fb,1} E + g_{fb,2} \int_0^t dt' E(t) + g_{fb,3} \frac{dE(t)}{dt},$$

where the first, second and third terms are proportional, integral and differential control, respectively. The $g_{fb}$ coefficients are feedback gain coefficients for the various terms.

Referring now to the feed-forward portion of the AGC arrangement in FIG. 7, the change in the pump bias current that would need to be made in response to a change in the input power to maintain constant gain is $$\frac{dI_b}{dt} = m * \frac{dI_{pi}}{dt}$$

The slope coefficient m depends on the conversion efficiency between the optical pump power and the signal power, the gain of the amplifier, as well as the various efficiencies of the photodiodes and the pump source diode and the like.

In order to make feedback equations easily compatible with feedforward equations, the feedback equation may be differentiated in order to calculate the change in the bias current needed to control the amplifier. For instance, a proportional-integral-differential feedback scheme may be implemented with the following equation:

$$\frac{dI_b}{dt} = g_{fb,1} \frac{dE}{dt} + g_{fb,2} E + \frac{d^2 E}{dt^2}.$$

When the feedback and feed-forward portions of the AGC arrangement are implemented simultaneously the error signals for each portion contribute to the determination of the total requisite change in
the pump bias current, which now may be represented as $$\frac{dI_b}{dt} = g_{fb,1} \frac{dE}{dt} + g_{fb,2} E + \frac{d^2 E}{dt^2} + m \frac{dI_{pi}}{dt}.$$

An important advantage of the inventive AGC arrangement is that it can provide the speed of a feed-forward arrangement with the accuracy and control of a feedback arrangement. For example, arbitrarily large changes to the pump bias current $I_b$ can be immediately made based on changes to the input signal power without the need to wait for a time period equivalent to the response time of the EDFA. The slope coefficient m can be optimized assuming the input signal includes its maximum number of allowable channels, both before and after the occurrence of the transient, and further assuming that changes in the signal power are equally distributed among all the channels. In this way, the error in the feed-forward portion of the AGC arrangement caused by changes in the spectral content of the input signal will be minimized.

In the case of a very fast transient where the input power changes much more quickly than the response time of both the AGC and the EDFA (i.e. <<1 µs), the feed-forward portion of the arrangement will be the first to respond to the transient (in a time determined by the AGC electronics) and then the feedback portion of the arrangement will subsequently correct any errors induced by the feed-forward portion of the arrangement.

The feedback circuit 68 shown in FIG. 7 may be configured in any manner known to those of ordinary skill in the art. For example, it may be implemented with either digital or analog electronics and in hardware or a combination of hardware and software.

Other important advantages of the present invention may be better appreciated by first considering feedback-only AGC arrangements. In particular, the behavior of an AGC arrangement that only employs feedback depends critically on the feedback gain coefficients $g_{fb}$. If the integral feedback gain coefficient is too large, the pump bias current $I_b$ will not converge to a constant value or will experience a slowly damped oscillation about the desired value. If the differential feedback coefficient is too large, the system will be overly sensitive to noise with the pump erratically oscillating about its optimum value. If the integral feedback gain coefficient is too small, large gain excursions will be experienced or the pump bias will never completely reach the desired value. In general, there will exist a trade-off between the stability of the steady-state operation and its immunity to noise and the maximum gain excursion produced by the AGC. While these considerations are also applicable to the present invention, they may be of less critical importance for the reasons presented below.

One advantage of the present invention is that the degree of accuracy that is required in selecting the feedback gain coefficients is reduced, while also permitting smaller values to be used. As previously mentioned, without the feed-forward component, the performance of the AGC is critically dependent on the selection of an appropriate feedback gain coefficients. For instance, in order to minimize the peak gain excursion of the optical signal with an AGC arrangement that employs a feedback component but not a feed-forward component, the integral and differential feedback gain coefficients can be increased to minimize the peak gain excursion, but at the expense of inducing oscillations in the output power and increasing the system's sensitivity to noise. However, by using a feed-forward scheme in combination with a feedback approach, the peak gain divergence can be limited by the feed-forward scheme, and therefore a smaller value of the feedback gain coefficient can be used, thus avoiding the induced oscillations.

The particular embodiment of the invention illustrated in FIG. 7 shows a forward pumping construction in which pump light emitted by pump laser 62 travels through erbium-doped optical fiber 60 in the same direction as the wavelength-multiplexed optical signal. However, a backward pumping construction could also be used, where a pump laser provides pump light that travels through erbium-doped optical fiber 60 in the opposite direction as the wavelength-multiplexed optical signal. Further, a bi-directional pumping construction could be used, where two pump lasers provide pump light that travels through erbium-doped optical fiber 60 in both directions. The pump wavelength could be ~980 nm or ~1480 nm or a combination of the two wavelengths. Thus, the present invention is not intended to be limited to any specific type of directional pumping scheme, pumping wavelength, number of pumps or even the number of amplifier stages. In many cases the particular pumping arrangement that is employed will be dictated by stability and noise considerations.

In one alternative embodiment of the invention, only the feedback portion of the arrangement may be operational unless and until a sufficiently large change in the input optical power is detected. In this way the AGC arrangement achieves the accuracy of the feedback portion of the arrangement and the speed of the feed-forward portion is only used when the response time of the feedback portion is not sufficiently fast to handle the transient. Those of ordinary skill in the art will recognize that this embodiment of the invention can be implemented in a variety of different ways. For instance, a digital signal processor (DSP) with an interrupt could be used to monitor the control signals received by the feedback circuit. Separate electronics could be used to monitor the input signal power. When the input signal power changes by more than a threshold value (e.g., 1 dB), an interrupt on the DSP is triggered so that the feed-forward portion of the arrangement becomes operational. When the change in the input signal power drops below the threshold level, the DSP returns control to the feedback portion of the arrangement.

In one embodiment of the invention, the feedback portion of the arrangement may act upon a set of averaged measurements, whereas the feedforward portion may act upon a measurement with little or no averaging. In this manner, the feedback portion of the arrangement acts more slowly but with higher accuracy than does the feedforward portion of the arrangement. The maximum change in the output signal power and the peak gain excursion that can be achieved with the inventive gain control arrangement is determined by the latency of the control loop used to implement the AGC and the response time of the EDFA. In some embodiments of the invention an optical delay line may be inserted between the coupler 70 (see FIG. 7) that extracts a portion of the input signal and the erbium doped fiber 60 to further reduce both the maximum change in the output signal power and the peak gain excursion. In this way, transients in the input signal power can be made to propagate through an optical delay line whose transit time approximately equals the total latency in the AGC control loop, which is determined by the sum of the response time of the feedback circuit 60, the response time of the pump laser 62, and the transit times from the coupler 70 to the feedback circuit 68 and from the pump laser 62 to the doped fiber 60. For instance, if the latency of the AGC loop is 1 $\mu$s, the optical delay line may be an optical fiber about 200 m in length. This length of fiber would impart negligible loss (i.e., ~0.04 dB) and would consume a sufficiently small volume to be practical. This approach may be particularly effective in the embodiment of the invention in which the feed-forward portion of the arrangement is only active when its speed is required, or alternatively, when analog control electronics are employed.

Figure 1:
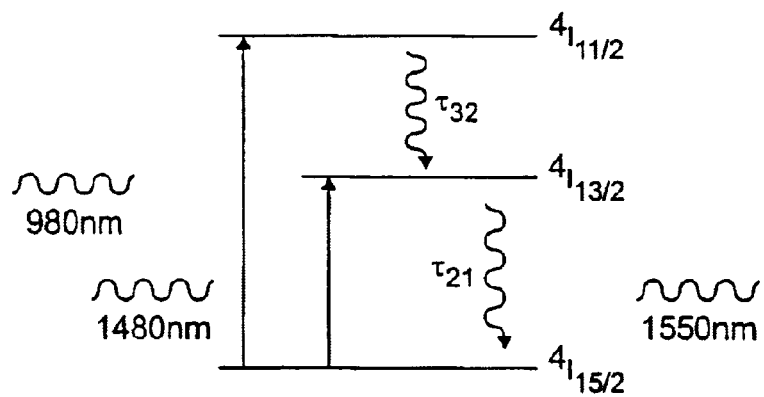
FIG. 1 shows an energy level diagram for the $Er^{+3}$ system.
Figure 2:
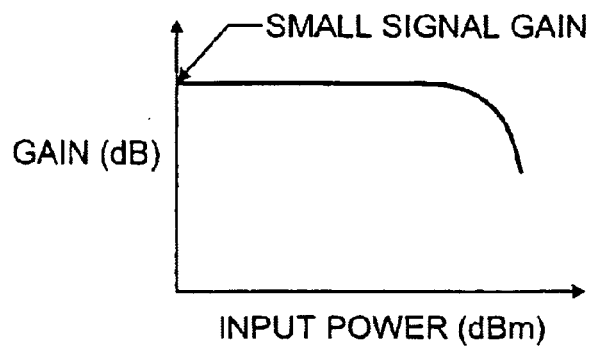
FIG. 2 shows the variation in the gain of a typical optical amplifier with the total input signal power.
Figure 3:
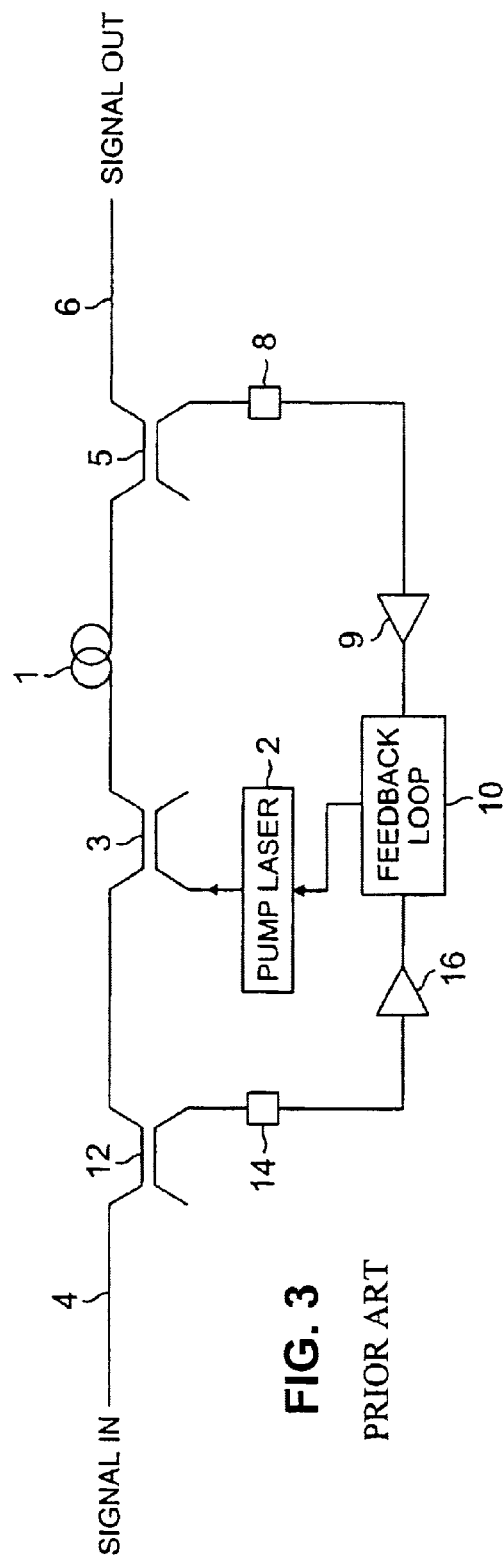
FIG. 3 shows a conventional optical amplifier with feedback control utilizing input and output taps.

In an amplifier utilizing 980 nm pump light, even if the pump power is instantaneously adjusted to the optimum steady-state power following a transient in the input power, there is still a momentary disturbance in the optical gain of the amplifier due to changes in the population of the $^4I_{11/2}$ level, as depicted in FIG. 1. As a result of this effect, even when the length of the optical delay line is appropriately chosen to offset the total latency of the AGC control loop and when the correction of the feed-forward circuit is perfect, there is still a disturbance in the optical gain of an amplifier controlled with a 980 nm pump. Under these conditions, the length of the optical delay line can be further increased to minimize the maximum gain divergence experienced by the amplifier.

Figure 8:
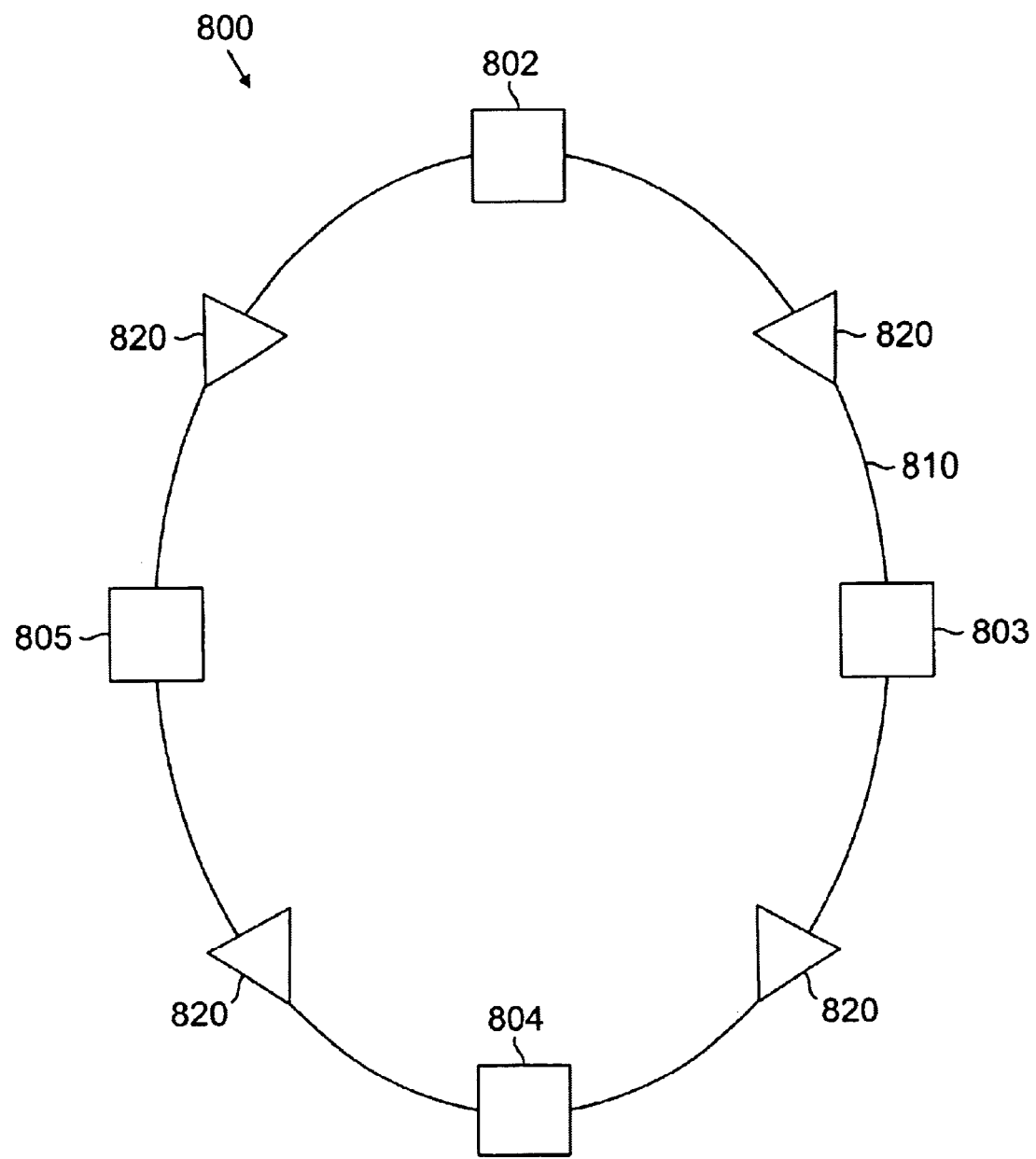
FIG. 8 shows a functional block diagram of an exemplary WDM ring network in which the present invention may be employed.

FIG. 8 shows a functional block diagram of an exemplary WDM ring network 800 in which the present invention may be employed. Ring network 800 includes a plurality of nodes 802–805 connected along a continuous, or looped, optical path 810. Each of these nodes is typically linked by a segment of optical fiber. Optical amplifiers 820 are located at appropriate points along the optical fiber segments. One or more of the optical amplifiers 820 may employ automatic gain control in accordance with the present invention. Nodes 802–805 generally include an optical switch such as an optical crossconnect or an optical add/drop multiplexer (OADM), user interfaces, and a network management element. The optical switches may be static switches in which particular wavelengths received on optical path 810 can only be received by predetermined ones of the local ports of the nodes. Alternatively, one or more of the optical switches may be reconfigurable optical switches in which any wavelength channel can be selectively dropped to any local port of the nodes. Such reconfigurable optical switches may be electro-optical elements, or, more preferably, all-optical elements. Examples of an all-optical reconfigurable switch are disclosed in U.S. patent application Ser. Nos. 09/571,833 and 09/691,812, which are hereby incorporated by reference in their entirety. The optical amplifiers of the present invention are particularly advantageous when employed in a WDM network having reconfigurable optical switches because of the power fluctuations that are likely to arise when the switches are reconfigured to add, drop or switch the path of the wavelengths. Of course, those of ordinary skill in the art will recognize that the present invention is equally applicable to other network topologies in addition to rings such as mesh or point-to-point topologies, for example.

What is claimed is:

1. A method for automatically controlling the gain of an optical amplifier, comprising:

generating a first control signal based on a feed-forward error signal and a second control signal based on the feedback error signal;

adjusting the pump source in accordance with the first and the second control signals unless a change in the power of an optical signal received at the input to the optical amplifier exceeds a predetermined threshold in which case the pump source is adjusted based on the first control signal and not the second control signal.

2. The method of claim 1 wherein the feed-forward error signal is proportional to said change in power of an optical signal received at an input to the optical amplifier.

3. The method of claim 1 wherein the feedback error signal is proportional to a difference between a desired gain and a measured gain, wherein the measured gain is determined from the power of an optical signal received at an input of the optical amplifier and the power of an optical signal received at an output of the optical amplifier.

4. The method of claim 1 wherein the feedback error signal is proportional to the difference between a desired ASE power and the power of ASE received at an output of the optical amplifier.

5. The method of claim 1 wherein the adjusting step is performed in accordance with a PID scheme.

6. The method of claim 1 wherein said optical amplifier is a rare-earth doped fiber amplifier.

7. The method of claim 6 wherein said rare-earth doped fiber amplifier is doped with erbium.

8. An optical amplifier with automatic gain control, comprising:

a rare-earth doped fiber for imparting gain to an optical signal propagating therethrough;

a pump source for supplying pump power to the rare-earth doped fiber;

a first optical power monitoring device for receiving a portion of output power generated by the rare-earth doped fiber and converting said portion of the output power to a first control signal;

a second optical power monitoring device for receiving a portion of the input optical signal and converting said portion of the input optical signal to a second control signal;

a controller receiving the first and second control signals and generating a bias current for driving the pump source, said bias current having a value based on at least first and second components, said first component being determined by the second control signal and not the first control signal and the second component being determined by at least the first control signal wherein the bias current is based on the first component only when a change in power of the optical signal received at the input to the rare-earth doped fiber exceeds a predetermined threshold.

9. The optical amplifier of claim 8 wherein said portion of the output power generated by the rare-earth doped fiber is a portion of an amplified optical signal.

10. The optical amplifier of claim 8 wherein said portion of the output power generated by the rare-earth doped fiber is a portion of ASE.

11. The optical amplifier of claim 8 wherein said controller is a PID controller.

12. The optical amplifier of claim 8 further comprising an optical delay line located between a portion of the second monitoring device and the rare-earth doped fiber.

13. The optical amplifier of claim 12 wherein said optical delay imparts a delay to an optical signal traveling therethrough that is approximately equal to an automatic gain control loop latency.

14. The optical amplifier of claim 13 wherein said automatic gain control loop latency is determined by a sum of a response time of the controller, a response time of the pump source, and optical transit times between the second coupler and the controller and between the pump source and the rare-earth doped fiber.

15. The optical amplifier of claim 12 wherein said optical delay imparts a delay to an optical signal traveling therethrough that is greater than the sum of a response time of the controller, a response time of the pump source, and optical transit times between the second coupler and the controller and between the pump source and the rare-earth doped fiber.

16. The optical amplifier of claim 8 wherein said first optical power monitoring device includes a first coupler located at the output of the doped fiber and a first photodetector for converting said portion of the output power to the first control signal.

17. The optical amplifier of claim 8 wherein said second optical power monitoring device includes a second coupler located at the input of the doped fiber and a second photodetector for converting said portion of the input power to the second control signal.

18. The optical amplifier of claim 17 further comprising an optical delay line located between the second coupler and the rare-earth doped fiber.

19. A WDM optical communication system, comprising:
a plurality of network nodes, each of said nodes including an optical switch;
at least one optical communication link interconnecting said nodes;
at least one optical amplifier located along the communication link, said optical amplifier including:
a rare-earth doped fiber for imparting gain to an optical signal propagating therethrough;
a pump source for supplying pump power to the rare-earth doped fiber;
a first optical power monitoring device for receiving a portion of output power generated by the rare-earth doped fiber and converting said portion of the output power to a first control signal;
a second optical power monitoring device for receiving a portion of the input optical signal and converting said portion of the input optical signal to a second control signal;
a controller receiving the first and second control signals and generating a bias current for driving the pump source, said bias current having a value based on at least first and second components, said first component being determined by the second control signal and not the first control signal and the second component being determined by at least the first control signal wherein the bias current is based on the first component only when a change in power of the optical signal received at the input to the rare-earth doped fiber exceeds a predetermined threshold.

20. The WDM optical communication system of claim 19 wherein said portion of the output power generated by the rare-earth doped fiber is a portion of an amplified optical signal.

21. The WDM optical communication system of claim 19 wherein said portion of the output power generated by the rare-earth doped fiber is a portion of ASE.

22. The WDM optical communication system of claim 20 wherein said controller is a PID controller.

23. The WDM optical communication system of claim 19 further comprising an optical delay line located between a portion of the second optical power monitoring device and the rare-earth doped fiber.

24. The WDM optical communication system of claim 23 wherein said optical delay imparts delay an optical signal traveling therethrough that is approximately equal to an automatic gain control loop latency.

25. The WDM optical communication system of claim 24 wherein said automatic gain control loop latency is determined by a sum of a response time of the controller, a response time of the pump source, and optical transit times between the second coupler and the controller and between the pump source and the rare-earth doped fiber.

26. The WDM optical communication system of claim 23 wherein said optical delay imparts a delay to an optical signal traveling therethrough that is greater than the sum of a response time of the controller, a response time of the pump source, and optical transit times between the second coupler and the controller and between the pump source and the rare-earth doped fiber.

27. The WDM optical communication system of claim 19 wherein said first optical power monitoring device includes a first coupler located at the output of the doped fiber and a first photodetector for converting said portion of the output power to the first control signal.

28. The WDM optical communication system of claim 19 wherein said second optical power monitoring device includes a second coupler located at the input of the doped fiber and a second photodetector for converting said portion of the input power to the second control signal.

29. The WDM optical communication system of claim 28 further comprising an optical delay line located between the second coupler and the rare-earth doped fiber.

30. The method of claim 1 wherein, at select times, the adjustment of the pump source is based simultaneously on the first and second control signals.

31. The method of claim 1 wherein, at select times, the adjustment of the pump source is based only on the first control signal.

32. The method of claim 1 wherein, at select times, the adjustment of the pump source is based only on the second control signal.

33. A method for automatically controlling the gain of an optical amplifier, comprising:

generating a first control signal based on a feed-forward error signal and a second control signal based on the feedback error signal;

adjusting the pump source in accordance with the second control signal and not the first control signal unless a sufficiently large change in power of an optical signal is received at the input to the optical amplifier in which case the pump source is adjusted based on both the first control signal and the second control signals.

34. The method of claim 33 wherein the feed-forward error signal is proportional to said change in power of an optical signal received at an input to the optical amplifier.

35. The method of claim 33 wherein the feedback error signal is proportional to a difference between a desired gain and a measured gain, wherein the measured gain is determined from the power of an optical signal received at an input of the optical amplifier and the power of an optical signal received at an output of the optical amplifier.

36. The method of claim 33 wherein the feedback error signal is proportional to the difference between a desired ASE power and the power of ASE received at an output of the optical amplifier.

37. The method of claim 33 wherein the adjusting step is performed in accordance with a PID scheme.

38. The method of claim 33 wherein said optical amplifier is a rare-earth doped fiber amplifier.

39. The method of claim 38 wherein said rare-earth doped fiber amplifier is doped with erbium.

40. A method for automatically controlling the gain of an optical amplifier, comprising:

generating a first control signal based on a feed-forward error signal and a second control signal based on the feedback error signal, wherein said second control signal is further based on a feedback gain coefficient that is smaller than would otherwise be employed in a gain control arrangement that exclusively employs a feedback error signal and not a feed-forward error signal;

adjusting the pump source in accordance with the first and second control signals.

41. The method of claim 40 wherein the feed-forward error signal is proportional to said change in power of an optical signal received at an input to the optical amplifier.

42. The method of claim 40 wherein the feedback error signal is proportional to a difference between a desired gain and a measured gain, wherein the measured gain is determined from the power of an optical signal received at an input of the optical amplifier and the power of an optical signal received at an output of the optical amplifier.

43. The method of claim 40 wherein the feedback error signal is proportional to the difference between a desired ASE power and the power of ASE received at an output of the optical amplifier.

44. The method of claim 40 wherein the adjusting step is performed in with a PID scheme.

45. The method of claim 40 wherein the control signal is based on the feed-forward error signal only when said change in the power of the optical signal received at the input to the optical amplifier exceeds a predetermined threshold.

46. The method of claim 40 wherein said optical amplifier is a rare-earth doped fiber amplifier.

47. The method of claim 46 wherein said rare-earth doped fiber amplifier is doped with erbium.

* * * * *

UNITED STATES PATENT AND TRADEMARK OFFICE
CERTIFICATE OF CORRECTION

| | | |
|---|---|---|
| PATENT NO. | : 6,989,923 B2 | |
| APPLICATION NO. | : 09/925838 | |
| DATED | : January 24, 2006 | |
| INVENTOR(S) | : Andrew John Stentz | |

It is certified that error appears in the above-identified patent and that said Letters Patent is hereby corrected as shown below:

Abstract, line 4, change last word "the", to -- a --.

Specification, Col. 1, line 19, after "optical", insert -- , --.

Specification, Col. 1, line 20, after first word "electrical", insert -- , --.

Specification, Col. 2, line 33, before "the", insert -- , --.

Specification, Col. 2, line 43, after "age", insert -- , --.

Specification, Col. 4, line 24, change last word "PID" to -- proportional-intergral-differential (PID) --.

Specification, Col. 4, line 55, after "on", change "the" to -- a --.

Specification, Col. 6, line 24, after "detector", and after "66", insert -- , --.

Specification, Col. 6, line 31, after last word "detector", insert -- , --.

Specification, Col. 6, line 32, after "72", insert -- , --.

Specification, Col. 6, lines 65-66, after "approach,", change "known as proportional-intergral-differential (PID)" to -- (PID) --, and after "feedback", insert -- , --.

UNITED STATES PATENT AND TRADEMARK OFFICE
CERTIFICATE OF CORRECTION

PATENT NO. : 6,989,923 B2
APPLICATION NO. : 09/925838
DATED : January 24, 2006
INVENTOR(S) : Andrew John Stentz It is certified that error appears in the above-identified patent and that said Letters Patent is hereby corrected as shown below:

Specification, Col. 7, line 33, after "simultaneously", insert -- , --.

Specification, Col. 8, line 27, after "of", delete -- an --.

Specification, Col. 9, line 45, after "is", change "instantaneous" to -- instantaneously --.

Claim 1, Col. 10, line 27, change last word "the" to -- a --.

Claim 1, Col. 10, line 30, after "signals", insert -- , --.

Claim 1, Col. 10, line 32, after "threshold", insert -- , --.

Claim 24, Col. 12, line 29, after "imparts", insert -- a --.

Claim 24, Col. 12, line 29, before "an", insert -- to --.

Claim 33, Col. 13, line 4, after "on", change last word "the" to -- a --.

Claim 33, Col. 13, line 7, before "unless", insert -- , --.

Claim 33, Col. 13, line 9, after "amplifier", insert -- , --.

Claim 33, Col. 13, line 11, change last word "signals", to -- signal --.

UNITED STATES PATENT AND TRADEMARK OFFICE
CERTIFICATE OF CORRECTION

PATENT NO. : 6,989,923 B2
APPLICATION NO. : 09/925838
DATED : January 24, 2006
INVENTOR(S) : Andrew John Stentz It is certified that error appears in the above-identified patent and that said Letters Patent is hereby corrected as shown below:

Claim 40, Col. 13, line 34, change last word "the", to -- a --.

Claim 44, Col. 14, line 24, after "in", insert -- accordance --.

Signed and Sealed this

Twenty-sixth Day of September, 2006

JON W. DUDAS
*Director of the United States Patent and Trademark Office*